(12) United States Patent
Liu (10) Patent No.: US 7,565,860 B1
(45) Date of Patent: Jul. 28, 2009

(54) MULTI-FUNCTIONAL HOT BEVERAGE BREWING DEVICE

(76) Inventor: Donald C. Liu, 39 Robinwood Rd., Trumbull, CT (US) 06611

( * ) Notice: Subject to any disclaimer, the term of this patent is extended or adjusted under 35 U.S.C. 154(b) by 632 days.

(21) Appl. No.: 11/283,220

(22) Filed: Nov. 21, 2005

(51) Int. Cl.
*A47J 31/00* (2006.01)
(52) U.S. Cl. .......................... 99/291; 99/307; 99/323.3
(58) Field of Classification Search ................ 99/291, 99/279, 307, 323.3, 290, 300
See application file for complete search history.

(56) References Cited

U.S. PATENT DOCUMENTS

| | | | |
|---|---|---|---|
| 4,757,754 A * | 7/1988 | Welker | 99/307 |
| 4,770,090 A | 9/1988 | Woon et al. | |
| 4,882,983 A | 11/1989 | Pastrick | |
| D337,915 S * | 8/1993 | Kahlcke | D7/308 |
| 5,233,914 A | 8/1993 | English | |
| 5,377,581 A | 1/1995 | Campbell | |
| D356,923 S | 4/1995 | Reinardy et al. | |
| 5,829,340 A * | 11/1998 | Yang | 99/290 |
| RE37,173 E | 5/2001 | Jefferson et al. | |
| D452,106 S * | 12/2001 | Seiffert | D7/305 |
| 7,089,849 B2 * | 8/2006 | Chen et al. | 99/290 |
| 2006/0011069 A1 * | 1/2006 | Spencer | 99/307 |

* cited by examiner

*Primary Examiner*—Reginald L Alexander (57) ABSTRACT

A device includes an obliquely shaped base member that has planar top and bottom surfaces. Decanters are removably positional on the top surface and each decanter includes a removable lid. A mechanism is included for simultaneously brewing a plurality of hot decanted beverages that is directly attached to the top surface of the base member and includes a housing that has a central region and a handle connected to a top surface thereof. The simultaneous brewing mechanism further includes a pair of isolated reservoirs monolithically formed with the central region. Each reservoir includes a spout positioned along a bottom edge thereof. Another mechanism is included for abutting another decanter against the simultaneous brewing mechanism. Such another decanter is firmly maintained in a vertical manner so that the hot beverage stored therein will not spill out of the one decanter. The securely abutting mechanism is removably connected to the housing.

15 Claims, 5 Drawing Sheets

MULTI-FUNCTIONAL HOT BEVERAGE BREWING DEVICE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to beverage brewing devices and, more particularly, to a multifunctional hot beverage brewing device for brewing a variety of hot decanted beverages.

2. Prior Art

The present invention pertains generally to conventionally-known, automatic drip-type coffee makers. Such coffee makers typically include a reservoir for water, a heating element to heat the water, and a container or basket ("brew funnel") adapted to hold the coffee (generally in a filter) and to receive the heated water. The heated water is allowed to drip onto and "wet" the coffee in the container. The brewed coffee is drained from the container through an aperture located at the bottom thereof into a decanter.

With the public popularity of tea as an alternative or substitute for coffee, it has become desirable to provide an automatic machine which is capable of brewing coffee and/or tea. Existing drip coffee makers however provide less than satisfactory results if loose tea leaves or tea bags are used therewith. One reason is that tea, unlike coffee, must be steeped to produce a satisfactory beverage. A second reason is that automatic drip coffee makers are simply not designed for brewing or steeping tea. In this respect, the basket or brew funnels of drip coffee makers are specifically designed to develop a head of water such that the coffee therein is wetted (submerged) by the water. This head of water is dependent upon the rate the brewed coffee drains from the funnel during the brewing cycle, as well as upon the rate at which the hot water is introduced into the funnel.

Importantly, the drain rate is a function of a number of factors which create a resistance to flow. Some of these factors, such as the configuration and physical dimensions of the brew funnel (e.g. flow channels, drain hole size etc.) are constant, while other factors such as the grind of the coffee (coarseness or fineness), the water hardness and the porosity of the filter paper used therein are variables. With respect to the variable factors, tea is completely unlike coffee in its wetting characteristics.

Thus, machines designed for coffee in many instances do not produce the desired head of water in the brew funnel when tea is used therein. This is especially true when tea bags are used and the tea bags are placed or shift away from (i.e. do not cover) the drain aperture, in such situations the drain aperture is unobstructed and the drain flow rate substantially increases, which in turn reduces the head of water in the basket. Thus, for the aforementioned reasons, making tea in drip coffee makers is known heretofore in many instances to produce less than optimum results.

Accordingly, a need remains for a multifunctional hot beverage brewing device in order to overcome the above-noted shortcomings. The present invention satisfies such a need by providing hot beverage brewing device that is versatile, safe, efficient, durable, light weight and compact in design. Such a device is easy to use and eliminates the hassle and mess associated with loose tea leaves. This allows for quicker and easier cleanup, saving the user a considerable amount of time and energy. The device advantageously further allows for greater control and flexibility of brew strength, thus, the desired strength is more easily achieved. The offering of a travel sized version of the device conveniently grants the user all the benefits of the full-sized, even when traveling. This conveniently saves money, time and gas that would otherwise be spent at rest stops to purchase coffee, tea or other hot beverages.

BRIEF SUMMARY OF THE INVENTION

In view of the foregoing background, it is therefore an object of the present invention to provide a multi-functional hot beverage brewing device. These and other objects, features, and advantages of the invention are provided by a device for brewing a variety of hot decanted beverages.

The beverage brewing device includes an obliquely shaped base member that has substantially planar top and bottom surfaces. Such a base member is conveniently portable between remote locations.

A plurality of decanters are removably positional on the top surface of the base member. Each of the decanters includes a removable lid directly conjoined therewith. One decanter preferably includes a beveled top surface sized and shaped for receiving the stem therein such that the stem becomes directly engaged with a top opening of one decanter. Such a decanter may further include a lid directly positional on the top opening thereof. Such a lid is provided with an outlet port or opening for effectively regulating a flow rate of the hot decanter beverage into one decanter by allowing air to escape from the decanter while hot fluids are deposited therein.

A mechanism is included for effectively simultaneously brewing a plurality of hot decanted beverages. Such a simultaneous brewing mechanism is directly attached to the top surface of the base member and includes a housing that has a central region vertically extending upwardly from the base member. The housing further includes a handle directly connected to a top surface thereof for advantageously assisting a user to transport the device without directly contacting the base member.

The simultaneous brewing mechanism further includes a pair of isolated reservoirs monolithically formed with the central region and oppositely spaced therefrom such that the decanters can effectively simultaneously receive the hot decanted beverages therein while being supported on the base member. Each reservoir includes a spout positioned along a bottom edge thereof. The reservoir preferably includes a horizontally oriented bottom surface monolithically formed with the spout. Such a bottom surface includes an annular shoulder integral with the spout and extending upwardly therefrom.

An insulating layer is directly seated on top of the bottom surface and lines an interior of the reservoir. Such an insulating layer is conformed about the shoulder and is directly abutted thereagainst. An O-ring is directly positioned on the insulating layer in such a manner that the O-ring is nested at an interior of the shoulder for advantageously preventing the hot decanted beverage from undesirably leaking out of the spout. A ribbed layer is directly situated on the O-ring. Such a ribbed layer includes a plurality of grooves for conveniently channeling the hot decanted beverage downwardly towards the spout.

The simultaneous brewing mechanism preferably further includes at least one discharge valve in fluid communication with one of the reservoirs and positioned therebeneath for effectively becoming directly intercalated between the decanters and one reservoir. Such a discharge valve includes a lever directly connected thereto in such a manner that the discharge valve can be manually engaged and disengaged with one spout during operating conditions. A stem is directly conjoined to at least one discharge valve. Such a stem is sized and shaped for medially supporting at least one discharge valve along a top surface thereof. The top surface of the stem is beveled and defines a groove along which the hot decanted beverage can pass. Such a groove has an annular shape and slopes downwardly from the top surface of the stem. The groove vertically passes downwardly through the stem for conveniently directing the hot decanted beverage into one decanter The present invention also includes a mechanism for securely abutting one of the decanters against the simultaneous brewing mechanism such that a user can readily transport one decanter while gripping only the simultaneous brewing mechanism during transporting procedures. Such a decanter is firmly maintained in a vertically oriented manner so that the hot decanted beverage stored therein will advantageously not spill out of the one decanter. The securely abutting mechanism is removably connected to the housing. Such a securely abutting mechanism preferably includes an anchor bracket directly conjoinable to a front face of the central region. A firm and rigid latch has a pair of oppositely disposed and monolithically formed arm portions extending substantially orthogonal to each other. One such an arm portion is directly interfitted into the anchor bracket and abutted against the central region. Another one of the arm portions is removably attachable to another one of the decanters.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime numbers refer to alternate embodiments of such elements.

The device of this invention is referred to generally in FIGS. 1-5 by the reference numeral 10 and is intended to provide a multi-functional hot beverage brewing device. It should be understood that the device 10 may be used to brew many different types of hot beverages and should not be limited in use to brewing only hot teas.

Figure 3:
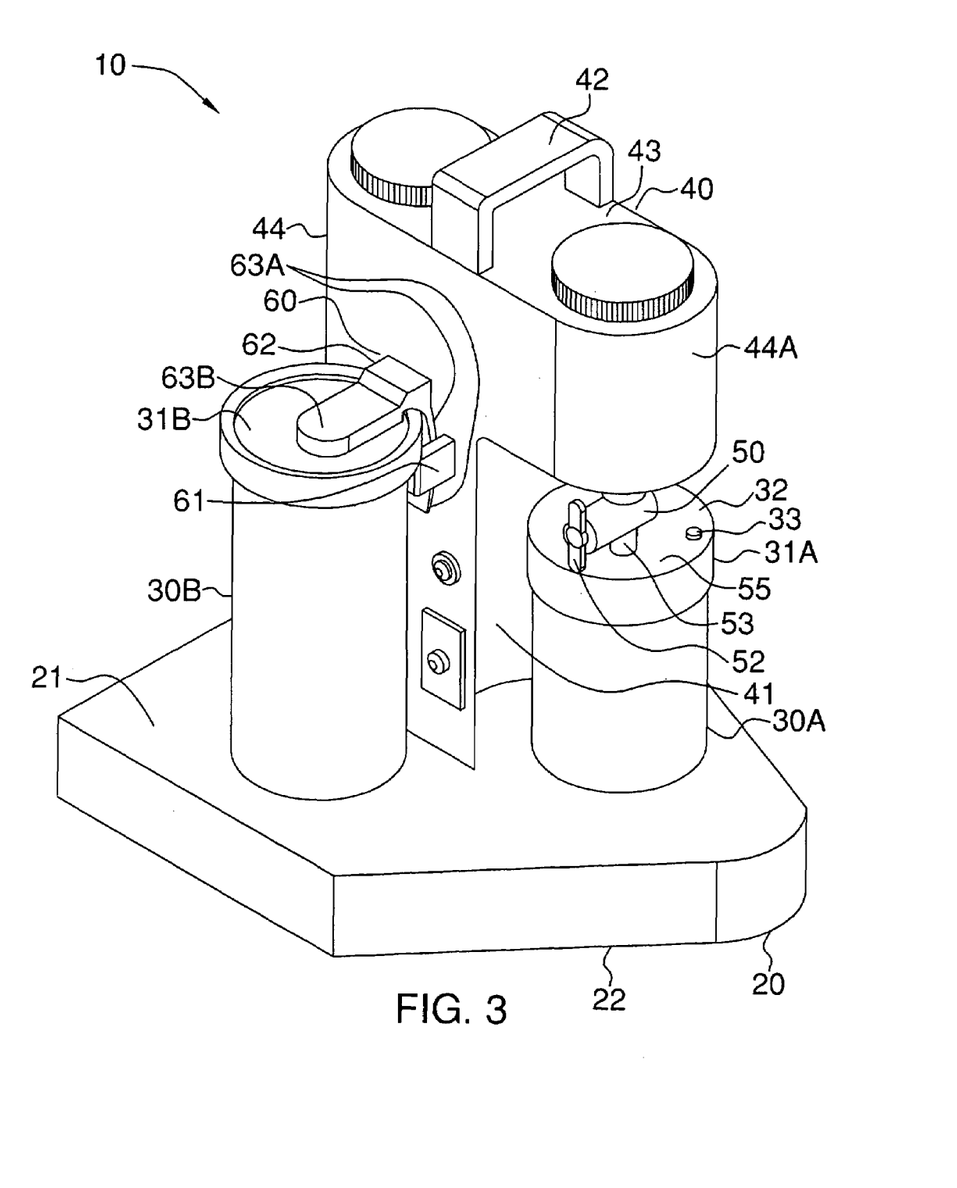
FIG. 3 is a perspective view showing a portable type multi-functional hot beverage brewing device; in accordance with the present invention.

Referring initially to FIG. 3, the device 10 includes an obliquely shaped base member 20 that has substantially planar top 21 and bottom 22 surfaces. Such a base member 20 is conveniently portable between remote locations, thus allowing for the use thereof at home, at work, and at any other desired destination.

A plurality of decanters 30 are removably positional on a recess formed in the top surface 21 of the base member 20. Each of the decanters 30A, 30B includes a removable lid 31A, 31B directly conjoined, with no intervening elements, therewith. One decanter 30A includes a top surface 32 sized and shaped for receiving the stem 53 (described herein below) therein such that the stem 53 becomes directly engaged with a top opening of one decanter 30A. This direct engagement conveniently prevents the fluid dispensed into the decanter 30A from losing heat in the form of steam, thus advantageously maintaining the beverage at a desired temperature for longer periods of time. One decanter 30A further includes a lid 31A directly positional, with no intervening elements, on the top opening 32 thereof. Such a lid 31A is provided with an outlet port or opening 33 with an open side roof that is important for effectively allowing air to escape from the decanter 30A while hot fluids are deposited therein.

Again referring to FIG. 3, a mechanism 40 is included that is essential for effectively simultaneously brewing a plurality of hot decanted beverages. Of course, the device 10 may also be used to simply brew hot water that may be used to make hot chocolate, ginseng tea, hot soymilk, etc, as is obvious to a person ordinary skill in the art. Such a simultaneous brewing mechanism 40 is directly attached, with no intervening elements, to the top surface 21 of the base member 20 and includes a housing 41 that has a central region vertically extending upwardly from the base member 20.

The housing 41 further includes a handle 42 directly connected, with no intervening elements, to a top surface 43 thereof that is vital and advantageous for assisting a user to transport the device 10 without directly contacting the base member 20. The handle 42 thus allows the device 10 to be carried with only one hand, while conveniently allowing the other hand to be used for other tasks, which would not be possible when carrying the device 10 by the base member 20 with both hands.

Referring to FIG. 3, the simultaneous brewing mechanism 40 further includes a pair of isolated reservoirs 44 monolithically formed with the central region and oppositely spaced therefrom, which are crucial so that the decanters 30A can effectively simultaneously receive hot, decanted beverages therein while being supported on the base member 20. Front reservoir 44A includes a spout 53 positioned along a bottom edge thereof that conveniently provides a passage for the brewed beverage to exit the reservoir 44A.

Figure 1:
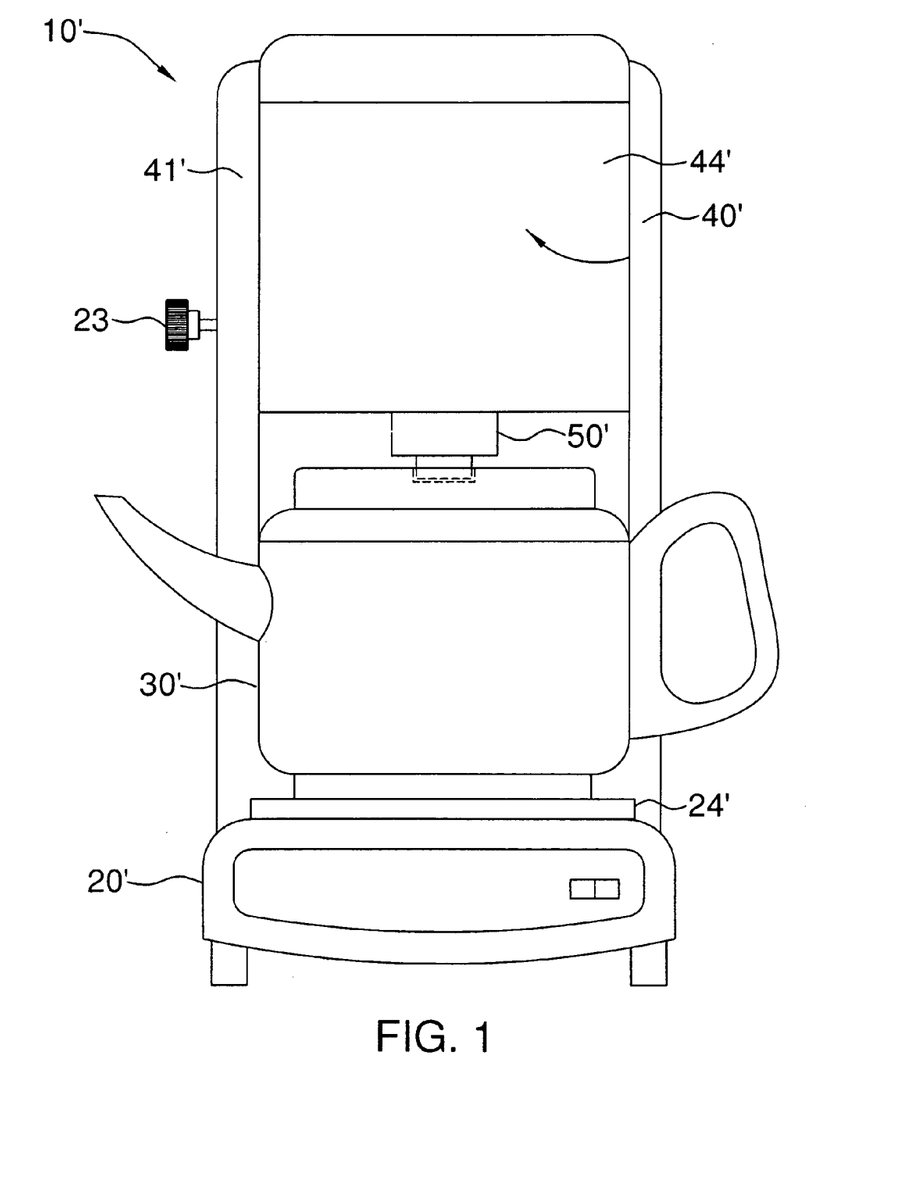
FIG. 1 is a front-elevational view showing an alternate embodiment of an appliance type multi-functional hot beverage brewing device, in accordance with the present invention.
Figure 4:
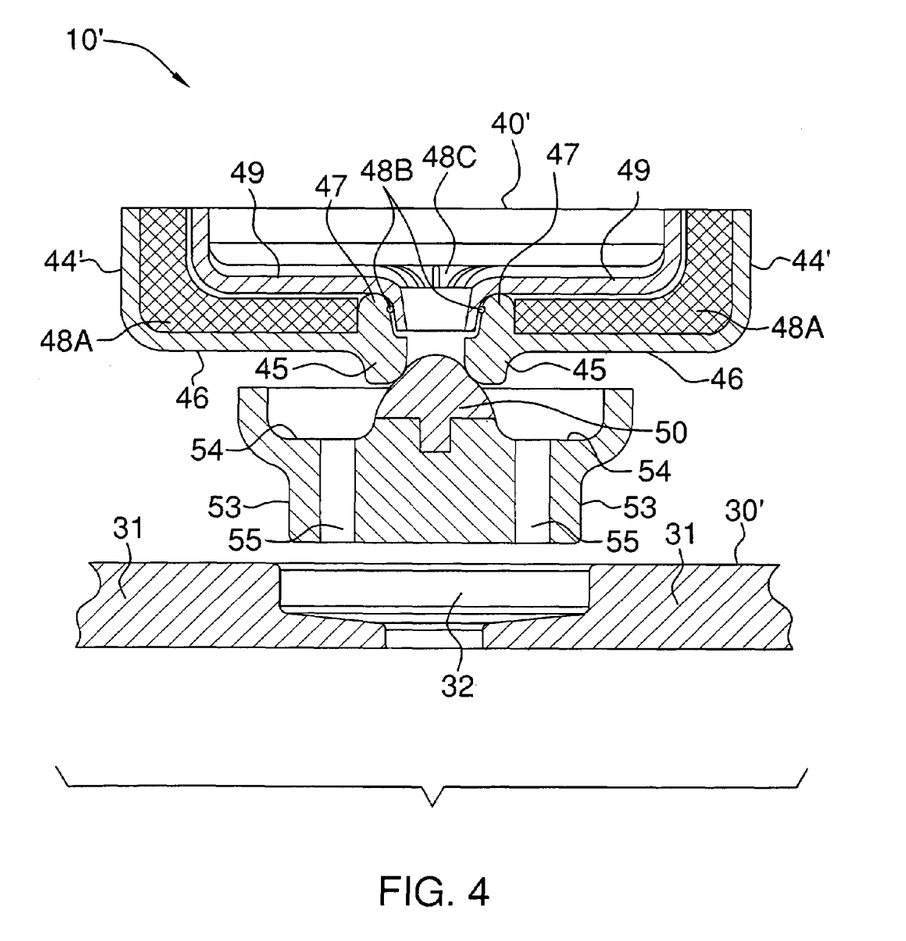
FIG. 4 is a cross-sectional view of the securely abutting mechanism shown in FIG. 1.

Referring to FIGS. 1 and 4, the reservoir 44' includes a horizontally oriented bottom surface 46 monolithically formed with the spout 45. Such a bottom surface 46 includes an annular shoulder 47 integral with the spout 45 and extending upwardly therefrom. The maximum water containing capacity of the reservoir (also defined as a media basket holder in such an embodiment) 44' is slightly less than the decanter's capacity, so as to conveniently prevent overfilling the decanter 30' during operating conditions. It is noted that reservoir (media basket holder) 44' is selectively pivotal outwardly and away from the brewing mechanism 40' so that the user can place fresh media baskets therein during repeated use.

Referring to FIG. 4, an insulating layer 48A is directly seated, with no intervening elements, on top of the bottom surface 46 and lines an interior of the reservoir (media basket holder) 44'. Such a layer is critical for effectively maintaining the brewed beverage at an elevated temperature, advantageously allowing for better flavor extraction from the beverage being brewed. Such an insulating layer 48A is conformed about the shoulder 47 and is directly abutted, with no intervening elements, thereagainst. An O-ring 48B is directly positioned, with no intervening elements, on the insulating layer 48A in such a manner that the O-ring 48B is nested at an interior of the shoulder 47, which is essential for advantageously preventing the hot decanted beverage from undesirably leaking out of the spout 45. A ribbed layer 48C is directly situated, with no intervening elements, on the O-ring 48B. Such a ribbed layer 48C includes a plurality of grooves 49 that are vital and convenient for channeling the hot decanted beverage downwardly towards the spout 45.

Referring to FIG. 4, the simultaneous brewing mechanism 40' further includes at least one discharge valve 50 in fluid communication with one of the reservoirs (media basket holder) 44' and positioned therebeneath for effectively becoming directly intercalated, with no intervening elements, between the decanter 30' and the one reservoir (media basket holder) 44'. Such a discharge valve 50 includes a lever 52 directly connected, with no intervening elements, thereto in such a manner that the discharge valve 50 can be manually engaged and disengaged with one spout 45 during operating conditions. A stem 53 is directly conjoined, with no intervening elements, to at least one discharge valve 50. Such a stem 53 is sized and shaped for medially supporting at least one discharge valve 50 along a top surface 54 thereof.

Figure 5:
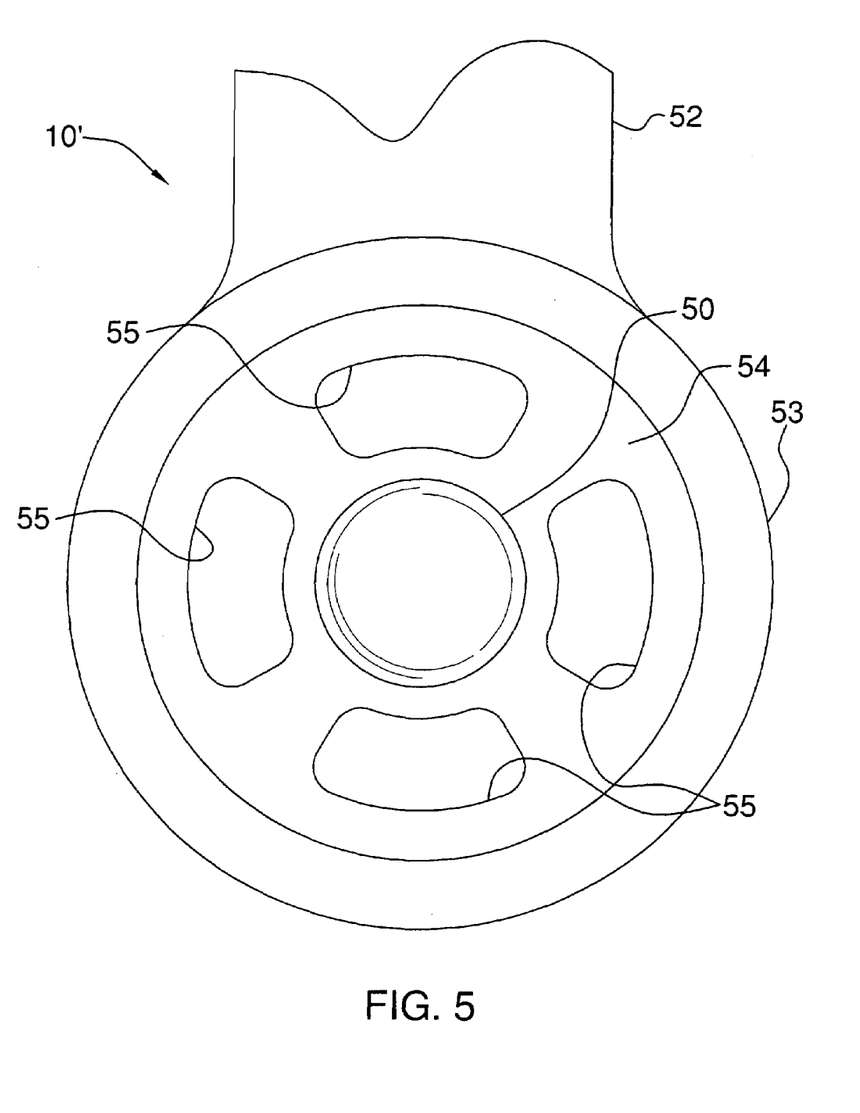
FIG. 5 is a top plan view of the stem shown in FIG. 4.

The top surface 54 of the stem is beveled and defines a groove 55 along which the hot decanted beverage can pass. Such a groove 55 has an annular shape and slopes downwardly from the top surface 54 of the stem 53. The groove 55 vertically passes downwardly through the stem 53 for conveniently directing the hot decanted beverage into one decanter 30'. During operating conditions, decanter 30' is prevented from being displaced away from stem 53 and reservoir (media basket holder) 44' because stem 53 and discharge valve 50 are directly abutted against a lower surface of spout 45. Advantageously, stem 53 becomes partially recessed or countersunk into the beveled top surface 32 for further maintaining decanter 30' at a substantially stable position. When stem valve 52 is rotated to a closed position, discharge valve 50 disengages spout 45 such that decanter 30' can be removed from beneath reservoir (media basket holder) 44'.

Referring to FIG. 3, the present invention also includes a mechanism 60 for securely abutting another decanter 30B against the simultaneous brewing mechanism 40 such that a user can readily transport another decanter 30B while gripping only the simultaneous brewing mechanism 40 during transporting procedures. Such another decanter 30B is firmly maintained in a vertically oriented manner so that the hot decanted beverage stored therein will advantageously not spill out of the decanter 30B. The securely abutting mechanism 60 is removably connected to the housing 41. Such a securely abutting mechanism 60 includes an anchor bracket 61 directly conjoinable, with no intervening elements, to a front face of the central region.

A firm and rigid latch 62 has a pair of oppositely disposed and monolithically formed arm portions 63A, 63B extending substantially orthogonal to each other. One such an arm portion 63A is directly interfitted, with no intervening elements, into the anchor bracket 61 and abutted against the central region. Another one of the arm portions 63B is removably attachable to the lid 31B of another one of the decanters 30B.

Figure 2:
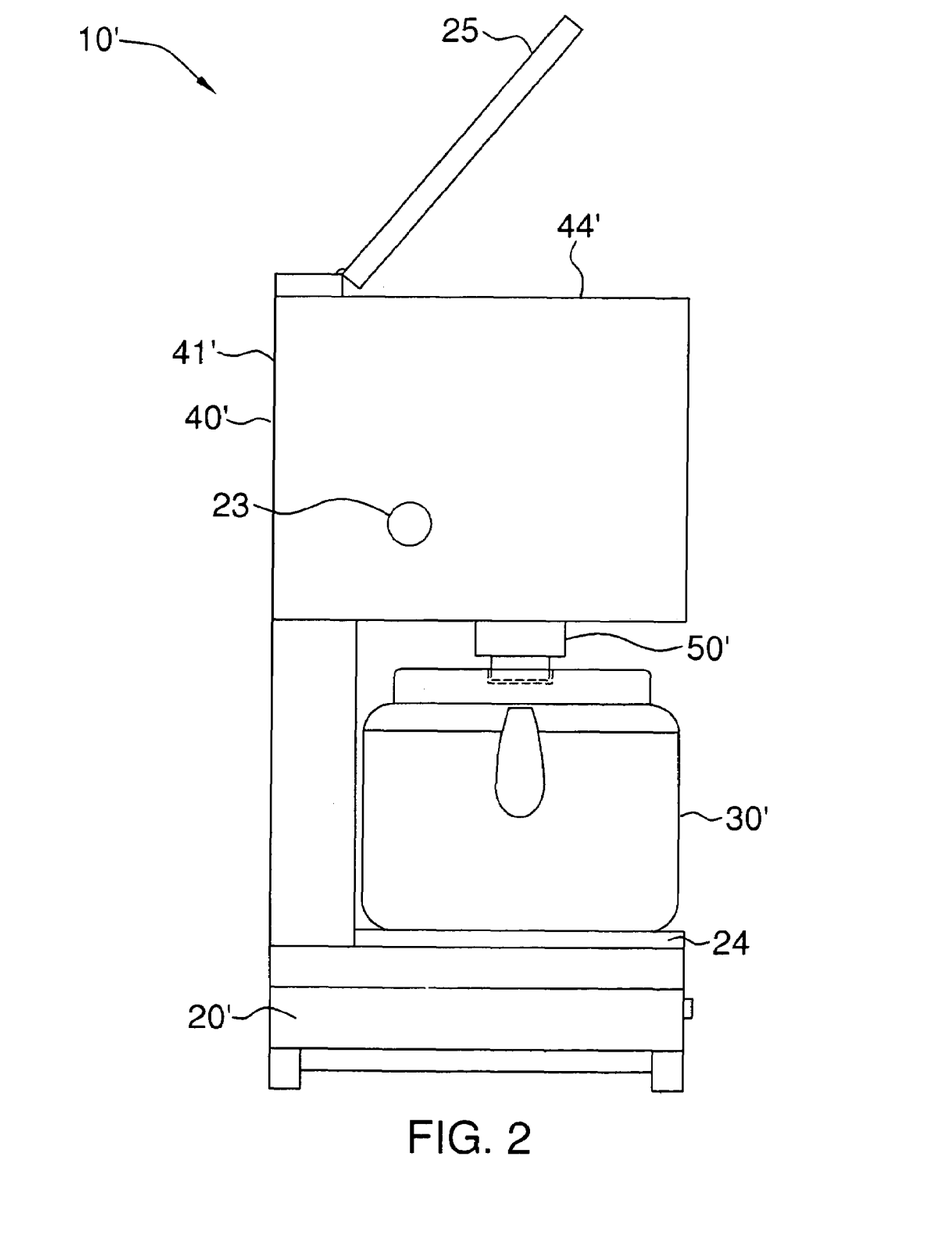
FIG. 2 is a side-elevational view of the device shown in FIG. 1.

Referring to FIGS. 1 and 2, in an alternate embodiment 10', the device further includes a control knob 23 directly connected, with no intervening elements, to the brewing mechanism housing 41'. Such a control knob 23 advantageously controls a flow rate of heated water from the reservoir (media basket holder) 44' to decanter 30' via a cam. This feature is essential and advantageous for allowing different beverage types to be brewed with altering amounts of head water. For example, tea leaves must be submerged in water for a longer amount of time than coffee grinds, in order to extract the flavor therefrom. Thus, the control knob 23 can be dialed to allow for the correct amount of flow depending on the type of beverage being brewed.

The device 10' further includes a warming plate 24 positioned beneath the decanter 30' for advantageously maintaining the brewed beverage at an elevated temperature that is usually preferred by those drinking such beverages. A pivotal lid 25 is attached along a rear position of the top surface of the housing 41' and advantageously grants the user easy access to the brewing mechanism 40' such that fresh water can easily be poured therein to be heated.

Referring to back to FIG. 3, decanter 30A preferably includes an insulating layer and is locked in place by employing a lid that can be rotated and slid along a hot drink transport tube such that the decanter 30A is engaged into a recess hole in the bottom portion of the device 10. Of course, several decanters 30A, 30B, etc. may be employed and suitably sized and shaped for being housed within a vehicle's mug holder.

During use of the device 10, an appropriate filter is placed into the reservoir 44, depending on the beverage being brewed. The user then places the coffee grinds or tea leaves in the filter and closes the reservoir 44A. Cold water is placed into the reservoir 44 and the decanter 30A is placed therebeneath. The device is then turned to the "ON" position, causing the water to be released into tubing that is heated via an electrical heating element. Steam generated from this process drives the boiling water into the dispenser in a short period of time. The heated water then mixes with the coffee grinds or tea leaves, extracting the flavor therefrom, and is dispensed into the decanter 30A via the spout 53.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A device for brewing a variety of hot decanted beverages, said device comprising:
    an obliquely shaped base member having substantially planar top and bottom surfaces, said base member being portable between remote locations;
    a plurality of decanters removably positional on said top surface of said base member, each said decanters including a removable lid directly conjoined therewith;
    means for simultaneously brewing a plurality of hot decanted beverages, said simultaneous brewing means being directly attached to said top surface of said base member and including a housing having a central region vertically extending upwardly from said base member, said simultaneous brewing means further including a pair of isolated reservoirs monolithically formed with said central region and oppositely spaced therefrom such that said decanters can simultaneously receive the hot decanted beverages therein while being supported on said base member, each said reservoir including a spout positioned along a bottom edge thereof; and
    means for securely abutting one said decanters against said simultaneous brewing means such that a user can readily transport said one decanter while gripping only said simultaneous brewing means during transporting procedures, said one decanter being firmly maintained in a vertically oriented manner so that the hot decanted beverage stored therein will not spill out of said one decanter;
    wherein said simultaneous brewing means comprises:
    at least one discharge valve in fluid communication with one said reservoirs and positioned therebeneath for becoming directly intercalated between said decanters and said one reservoir, said discharge valve comprising a lever directly connected thereto in such a manner that said discharge valve can be manually engaged and disengaged with one said spout during operating conditions; and
    a stem directly conjoined to said at least one discharge valve, said stem being sized and shaped for medially supporting said at least one discharge valve along a top surface thereof, said top surface of said stem being beveled and defining a groove along which the hot decanted beverage can pass, said groove having an annular shape and sloping downwardly from said top surface of said stem, said groove vertically passing downwardly through said stem for directing the hot decanted beverage into said one decanter.

2. The device of claim 1, wherein each said reservoir comprises:
    a horizontally oriented bottom surface monolithically formed with said spout, said bottom surface including an annular shoulder integral with said spout and extending upwardly therefrom;
    an insulating layer directly seated on top of said bottom surface and lining an interior of said reservoir, said insulating layer being conformed about said shoulder and directly abutted thereagainst;
    an O-ring directly positioned on said insulating layer in such a manner that said O-ring is nested interior of said shoulder for preventing the hot decanted beverage from undesirably leaking out of said spout; and
    a ribbed layer directly situated on said O-ring, said ribbed layer including a plurality of grooves for channeling the hot decanted beverage downwardly towards said spout.

3. The device of claim 1, wherein said one decanter includes a beveled top surface sized and shaped for receiving said stem therein such that said stem groove becomes directly engaged with a top opening of said one decanter.

4. The device of claim 3, wherein said one decanter includes a lid directly positional on said top opening thereof, said lid being provided with an opening for regulating a flow rate of the hot decanter beverage into said one decanter.

5. The device of claim 1, wherein said securely abutting means comprises:
    an anchor bracket directly conjoinable to a front face of said central region; and
    a firm and rigid latch having a pair of oppositely disposed and monolithically formed arm portions extending substantially orthogonal to each other, one said arm portions being directly interfitted into said anchor bracket and abutted against said central region, another said arm portions being removable attachable to another said decanter.

6. A device for brewing a variety of hot decanted beverages, said device comprising:
    an obliquely shaped base member having substantially planar top and bottom surfaces, said base member being portable between remote locations;
    a plurality of decanters removably positional on said top surface of said base member, each said decanters including a removable lid directly conjoined therewith;
    means for simultaneously brewing a plurality of hot decanted beverages, said simultaneous brewing means being directly attached to said top surface of said base member and including a housing having a central region vertically extending upwardly from said base member, said housing further including a handle directly connected to a top surface thereof for assisting a user to transport said device without directly contacting said base member, said simultaneous brewing means further including a pair of isolated reservoirs monolithically formed with said central region and oppositely spaced therefrom such that said decanters can simultaneously receive the hot decanted beverages therein while being supported on said base member, each said reservoir including a spout positioned along a bottom edge thereof; and
    means for securely abutting one said decanters against said simultaneous brewing means such that a user can readily transport said one decanter while gripping only said simultaneous brewing means during transporting procedures, said one decanter being firmly maintained in a vertically oriented manner so that the hot decanted beverage stored therein will not spill out of said one decanter;

wherein said simultaneous brewing means comprises at least one discharge valve in fluid communication with one said reservoirs and positioned therebeneath for becoming directly intercalated between said decanters and said one reservoir, said discharge valve comprising a lever directly connected thereto in such a manner that said discharge valve can be manually engaged and disengaged with one said spout during operating conditions; and a stem directly conjoined to said at least one discharge valve, said stem being sized and shaped for medially supporting said at least one discharge valve along a top surface thereof, said top surface of said stem being beveled and defining a groove along which the hot decanted beverage can pass, said groove having an annular shape and sloping downwardly from said top surface of said stem, said groove vertically passing downwardly through said stem for directing the hot decanted beverage into said one decanter.

7. The device of claim 6, wherein each said reservoir comprises:

a horizontally oriented bottom surface monolithically formed with said spout, said bottom surface including an annular shoulder integral with said spout and extending upwardly therefrom;

an insulating layer directly seated on top of said bottom surface and lining an interior of said reservoir, said insulating layer being conformed about said shoulder and directly abutted thereagainst;

an O-ring directly positioned on said insulating layer in such a manner that said O-ring is nested interior of said shoulder for preventing the hot decanted beverage from undesirably leaking out of said spout; and a ribbed layer directly situated on said O-ring, said ribbed layer including a plurality of grooves for channeling the hot decanted beverage downwardly towards said spout.

8. The device of claim 6, wherein said one decanter includes a beveled top surface sized and shaped for receiving said stem therein such that said stem groove becomes directly engaged with a top opening of said one decanter.

9. The device of claim 8, wherein said one decanter includes a lid directly positional on said top opening thereof, said lid being provided with an opening for regulating a flow rate of the hot decanter beverage into said one decanter.

10. The device of claim 6, wherein said securely abutting means comprises:

an anchor bracket directly conjoinable to a front face of said central region; and a firm and rigid latch having a pair of oppositely disposed and monolithically formed arm portions extending substantially orthogonal to each other, one said arm portions being directly interfitted into said anchor bracket and abutted against said central region, another said arm portions being removable attachable to another said decanter.

11. A device for brewing a variety of hot decanted beverages, said device comprising:

an obliquely shaped base member having substantially planar top and bottom surfaces, said base member being portable between remote locations;

a plurality of decanters removably positional on said top surface of said base member, each said decanters including a removable lid directly conjoined therewith;

means for simultaneously brewing a plurality of hot decanted beverages, said simultaneous brewing means being directly attached to said top surface of said base member and including a housing having a central region vertically extending upwardly from said base member, said housing further including a handle directly connected to a top surface thereof for assisting a user to transport said device without directly contacting said base member, said simultaneous brewing means further including a pair of isolated reservoirs monolithically formed with said central region and oppositely spaced therefrom such that said decanters can simultaneously receive the hot decanted beverages therein while being supported on said base member, each said reservoir including a spout positioned along a bottom edge thereof; and means for securely abutting one said decanters against said simultaneous brewing means such that a user can readily transport said one decanter while gripping only said simultaneous brewing means during transporting procedures, said one decanter being firmly maintained in a vertically oriented manner so that the hot decanted beverage stored therein will not spill out of said one decanter, said securely abutting means being removably connected to said housing;

wherein said securely abutting means comprises an anchor bracket directly conjoinable to a front face of said central region; and a firm and rigid latch having a pair of oppositely disposed and monolithically formed arm portions extending substantially orthogonal to each other, one said arm portions being directly interfitted into said anchor bracket and abutted against said central region, another said arm portions being removable attachable to another said decanter.

12. The device of claim 11, wherein said simultaneous brewing means comprises:

at least one discharge valve in fluid communication with one said reservoirs and positioned therebeneath for becoming directly intercalated between said decanters and said one reservoir, said discharge valve comprising a lever directly connected thereto in such a manner that said discharge valve can be manually engaged and disengaged with one said spout during operating conditions; and a stem directly conjoined to said at least one discharge valve, said stem being sized and shaped for medially supporting said at least one discharge valve along a top surface thereof, said top surface of said stem being beveled and defining a groove along which the hot decanted beverage can pass, said groove having an annular shape and sloping downwardly from said top surface of said stem, said groove vertically passing downwardly through said stem for directing the hot decanted beverage into said one decanter.

13. The device of claim 11, wherein each said reservoir comprises:

a horizontally oriented bottom surface monolithically formed with said spout, said bottom surface including an annular shoulder integral with said spout and extending upwardly therefrom;

an insulating layer directly seated on top of said bottom surface and lining an interior of said reservoir, said insulating layer being conformed about said shoulder and directly abutted thereagainst;

an O-ring directly positioned on said insulating layer in such a manner that said O-ring is nested interior of said shoulder for preventing the hot decanted beverage from undesirably leaking out of said spout; and a ribbed layer directly situated on said O-ring, said ribbed layer including a plurality of grooves for channeling the hot decanted beverage downwardly towards said spout.

14. The device of claim 12, wherein said one decanter includes a beveled top surface sized and shaped for receiving said stem therein such that said stem groove becomes directly engaged with a top opening of said one decanter.

15. The device of claim 14, wherein said one decanter includes a lid directly positional on said top opening thereof, said lid being provided with an opening for regulating a flow rate of the hot decanter beverage into said one decanter.

* * * * *